United States Patent
Campbell et al.

(10) Patent No.: US 10,618,629 B2
(45) Date of Patent: Apr. 14, 2020

(54) AUTOMATED VARIABLE PITCH PROPELLER BLADE

(71) Applicant: GoPro, Inc., San Mateo, CA (US)

(72) Inventors: Scott Patrick Campbell, Belmont, CA (US); Leo Baldwin, Seattle, WA (US); Gary Fong, Cupertino, CA (US)

(73) Assignee: GoPro, Inc., San Mateo, CA (US)

( * ) Notice: Subject to any disclaimer, the term of this patent is extended or adjusted under 35 U.S.C. 154(b) by 665 days.

(21) Appl. No.: 15/231,783

(22) Filed: Aug. 9, 2016

(65) Prior Publication Data

US 2018/0043988 A1    Feb. 15, 2018

(51) Int. Cl.
| | |
|---|---|
| *B64C 11/34* | (2006.01) |
| *B64C 11/20* | (2006.01) |
| *B64C 11/26* | (2006.01) |
| *B64C 39/02* | (2006.01) |

(52) U.S. Cl.
CPC ............ *B64C 11/20* (2013.01); *B64C 11/26* (2013.01); *B64C 11/34* (2013.01); *B64C 39/024* (2013.01); *B64C 2201/027* (2013.01); *B64C 2201/108* (2013.01)

(58) Field of Classification Search
CPC ....... B64C 11/308; B64C 11/20; B64C 11/34; B64C 11/343; F04D 29/325; F04D 29/388
See application file for complete search history.

(56) References Cited

U.S. PATENT DOCUMENTS

| | | | | |
|---|---|---|---|---|
| 4,012,168 A | * | 3/1977 | Spellman | F04D 29/382 416/132 A |
| 4,784,575 A | * | 11/1988 | Nelson | B64C 11/18 416/144 |
| 5,181,678 A | * | 1/1993 | Widnall | B64C 3/48 244/219 |
| 8,210,738 B2 | * | 7/2012 | Hoefken | B01F 7/0005 366/330.3 |
| 8,829,101 B2 | * | 9/2014 | Jacob | C08J 5/04 524/494 |
| 9,541,061 B2 | * | 1/2017 | Sievers | F03D 1/0675 |
| 2016/0146022 A1 | * | 5/2016 | Twelves | B33Y 80/00 244/123.1 |
| 2016/0160658 A1 | * | 6/2016 | McCaffrey | F01D 5/282 415/200 |
| 2017/0058861 A1 | * | 3/2017 | Tobin | F03D 1/0675 |

OTHER PUBLICATIONS https://www.amesweb.info/Materials/Modulus-of-Elasticity-Metals.aspx.*

* cited by examiner

*Primary Examiner* — Ninh H. Nguyen
(74) *Attorney, Agent, or Firm* — Young Basile Hanlon & MacFarlane, P.C.

(57) ABSTRACT

A variable pitch propeller is designed to adjust the pitch of the propeller blade during flight to maximize the propeller efficiency. The propeller blade may comprise airfoil cross-sections. Each cross-section may be composed of different materials at the leading edge and trailing edge. In various embodiments, these materials are selected and oriented to achieve the necessary elastic moduli of the leading and trailing edge for the airfoil cross-section. During liftoff, the airfoil at the blade tip possesses a high blade pitch (e.g. 20 degrees), thereby increasing the generated lift on the propeller blades. During flight or hover conditions when maximal lift is no longer required, the trailing edge of the airfoil displaces upward and reduces the blade pitch to minimize the drag forces on the blade tip.

6 Claims, 7 Drawing Sheets

AUTOMATED VARIABLE PITCH PROPELLER BLADE

TECHNICAL FIELD

This disclosure relates to propeller blade designs, and more specifically, to a propeller blade system that changes the blade pitch in different flight conditions.

BACKGROUND

Aerial vehicles such as quadcopters are reliant on the propeller blades to liftoff, hover, and directionally fly. Fixed pitch propeller blades are only designed to be maximally efficient at one particular flight condition. Therefore, the efficiency of the fixed pitch propeller suffers during significant portions of flight. Propeller blades that are able to vary the blade pitch are conventionally controlled through mechanical systems that require the input of a pilot. Instead of being efficient at only one flight condition, the propeller may be controlled to be increasingly efficient during many different conditions. However, these mechanical systems are prone to inaccuracies, mechanical failure, and/or human error. There appears to be lacking mechanisms to accurately adjust the blade pitch during flight without human intervention.

BRIEF DESCRIPTIONS OF THE DRAWINGS

The disclosed embodiments have other advantages and features which will be more readily apparent from the following detailed description of the invention and the appended claims, when taken in conjunction with the accompanying drawings, in which:

FIG. 4A-D each illustrates an airfoil with a first material interspersed throughout a second material, in accordance with two example embodiments.

Figure 5A:
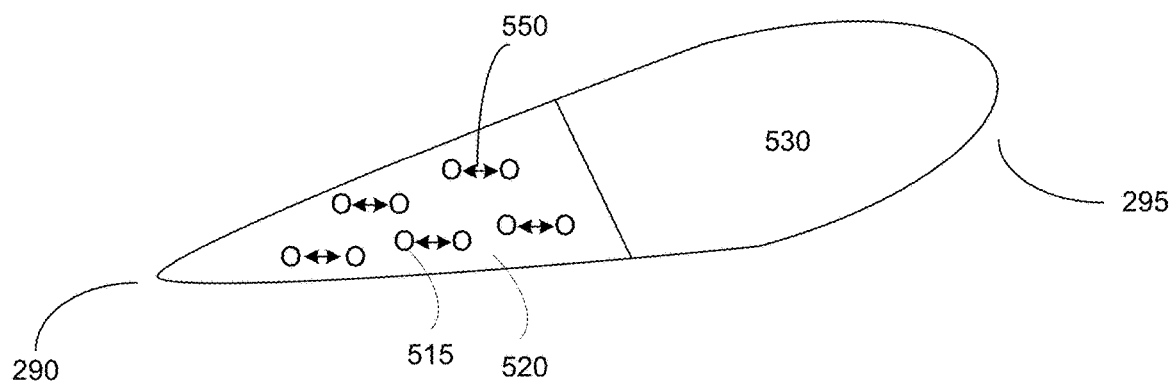
Figure 5B:
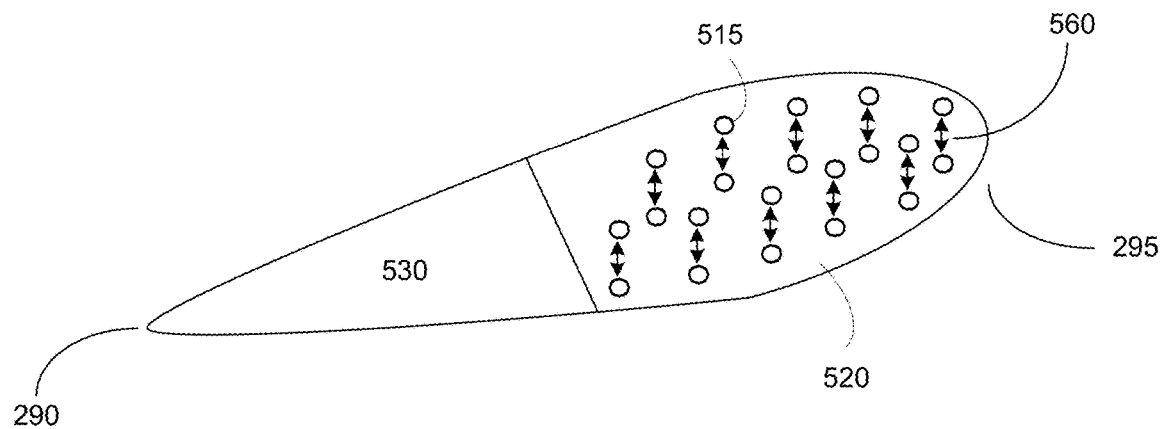

FIGS. 5A and 5B illustrate an airfoil with stimuli sensitive material, in accordance with two example embodiments.

Figure 6A:
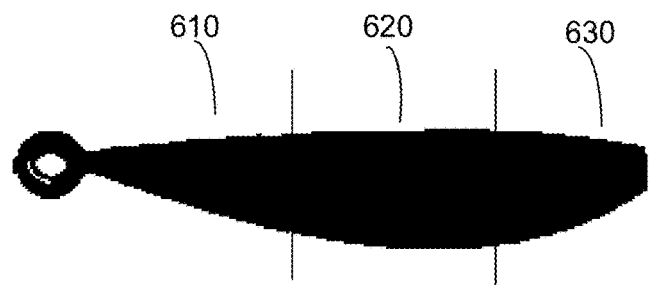

FIG. 6A illustrates a top-down view along the radius of the blade, in accordance with an example embodiment.

Figure 6B:
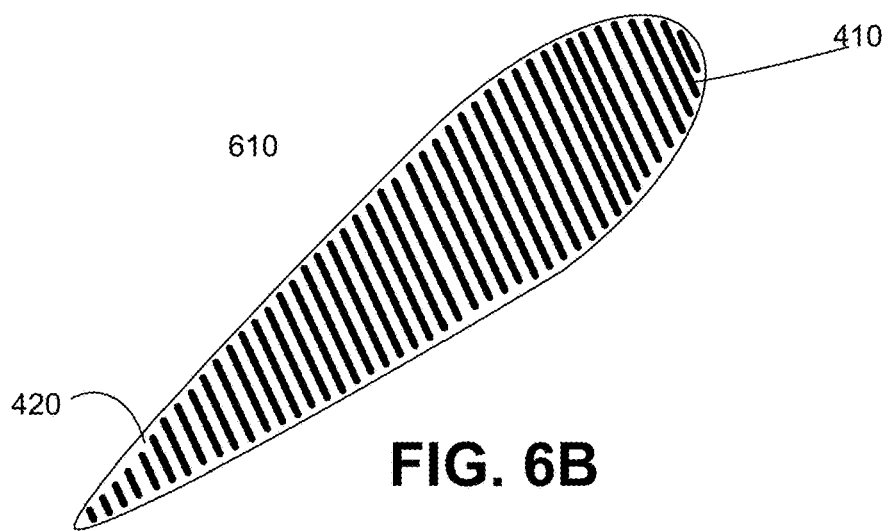
Figure 6C:
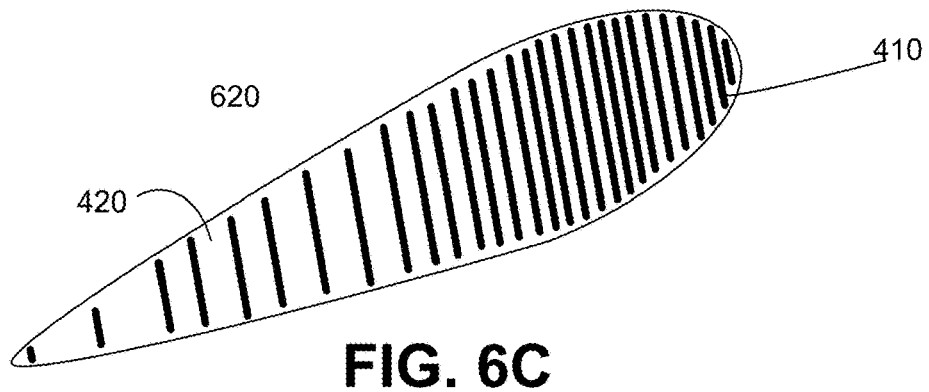
Figure 6D:
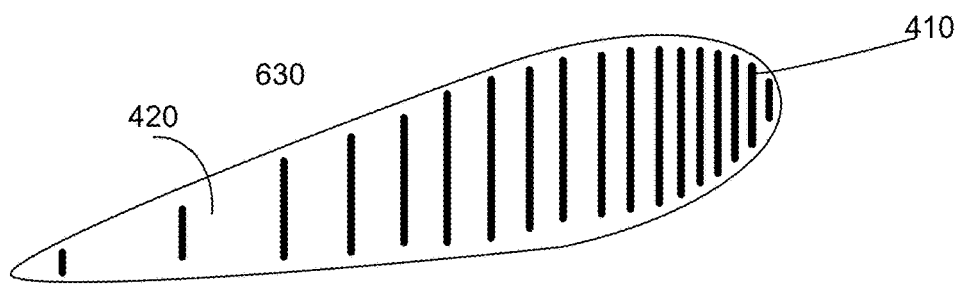

FIGS. 6B, 6C, and 6D illustrate airfoil cross-sections along the radius of the blade, in accordance with an example embodiment.

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Overview Configuration

Disclosed by way of example embodiments is a variable pitch propeller blade that alters the blade pitch depending on the flight condition (e.g. takeoff versus hover conditions). In various embodiments, the propeller blade is designed with sections that comprise materials with different stiffness levels, hereafter referred to as the elastic modulus of the section. As the propeller blade increases in rotational velocity, the sections respond to the generated lift forces by changing their blade pitch to minimize the drag forces exerted on the propeller blade. In turn, this maximizes the efficiency of the propeller blade. In varying embodiments, the sections may be designed with different materials and structural configurations to achieve a propeller blade that varies the blade pitch depending on the flight condition.

A propeller blade with a variable pitch propeller may maximize a lift during takeoff and minimize drag forces at hovering conditions. As an aerial vehicle, for ease of discussion herein referenced as a quadcopter, lifts off, each cross-section of the propeller blade, hereafter referred to as an airfoil cross-section, may be oriented with a blade pitch that enables the generation of a significant amount of lift along the radius of the blade. When the propeller blade is at higher rotational velocities (e.g. flying or hovering conditions), airfoil cross-sections may reduce their blade pitch, thereby minimizing the surface area exposed to the incoming wind. This minimizes drag forces while maintaining flight speed. In addition to improving the efficiency of the propeller blade, the variable blade pitch may be achieved in-flight without the need for human input, thereby minimizing errors, e.g., human or mechanical, that often accompanies conventional mechanical control systems.

Example Propeller Blade

Figure 1:
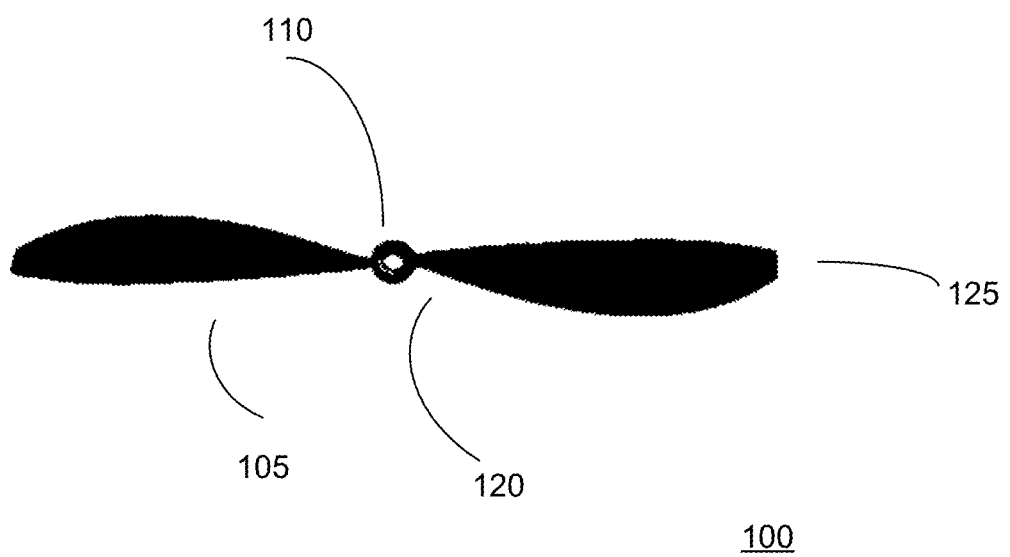
FIG. 1 illustrates a propeller, in accordance with an example embodiment.

Referring now to FIG. 1, it illustrates a propeller 100 viewed from a top-down perspective, in accordance with an example embodiment. In one embodiment, the propeller 100 comprises two opposing propeller blades (or blades) 105 coupled via a connector 110. The root 120 of the blade 105 is nearest to the connector 110, whereas the tip 125 of the blade 105 is farthest from the connector 110. The distance between the root 120 and the tip 125 is hereafter referred to as the radius of the blade 105. Even though FIG. 1 depicts two separate blades 105, in some embodiments, the propeller may include three, four, or more blades 105 coupled together via the connector 110. It is noted that although the structural elements of the propeller 100 have been individually identified, the propeller 100 may be either comprised of one of more of the elements fit together, e.g., via adhesives and/or mechanical connectors, or may be a unibody construction.

The airfoil, which is a cross-section at a particular point along the blade 105, may have significantly different designs depending on its location along the radius of the blade. For example, an airfoil at the root 120 of the blade 105 may have a significantly different composition than an airfoil at the tip of the blade 125. In some embodiments, the blade 105 is designed with a particular twist along the length of the blade 105. The blade twist is the change in blade pitch proceeding along the radius of the blade from the root 120 to the tip 125. Given that lift increases exponentially with the rotational velocity of the blade 105, the tip 125 of the blade 105 experiences significantly higher quantities of lift as compared to the root 120 of the blade 105, especially at higher rotational velocities. Therefore, the blade twist may be designed to provide proportionate amounts of lift across the radius of the blade. In some embodiments, the root 120 of the blade 105 may have the highest blade pitch whereas the tip 125 of the blade 105 possesses the lowest blade pitch.

Varying the Pitch of the Propeller Blade

Figure 2A:
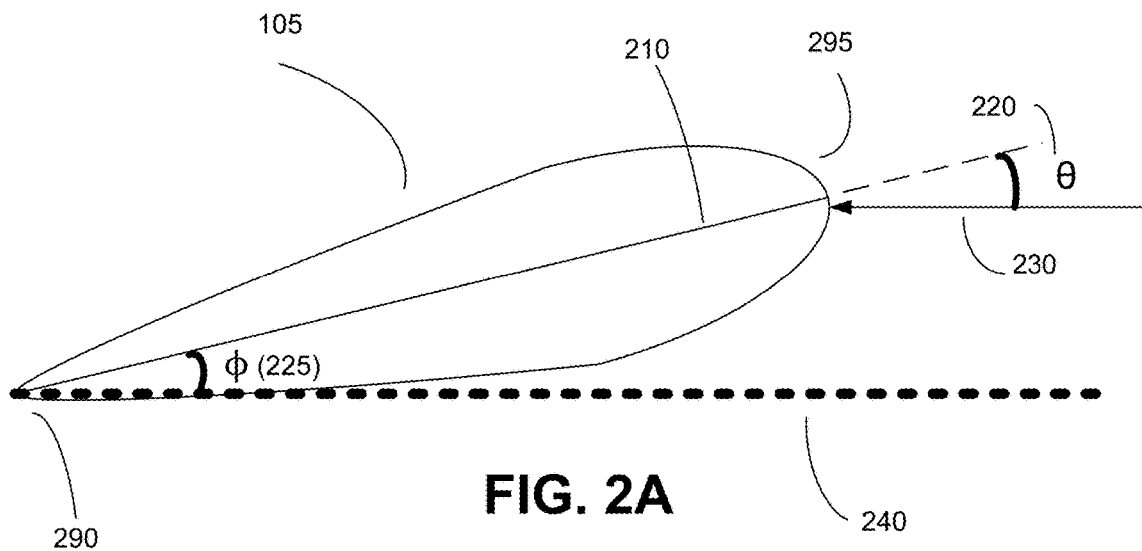
FIG. 2A illustrates an airfoil, during low propeller speeds, in accordance with an example embodiment.

Turning now to FIG. 2A, it illustrates an airfoil cross-section at the tip 120 of a blade 105, during low propeller speeds, in accordance with an example embodiment. The example embodiment shows designations for the trailing edge 290 and leading edge 295 of the blade 105, a chord line 210 of the blade 105, a relative wind direction 230, a vector extending from the imaginary horizon 240, an angle of attack (θ) 220, and a blade pitch (φ) 225. The angle of attack 220 may be referenced as the angle between the chord line 210, which connects the trailing edge 290 to the leading edge 295, and the relative wind 230 direction. The blade pitch 225 may be referenced as the angle between the chord line 210 and the imaginary horizon vector 240.

For ease of discussion relative to the figure, the relative wind 230 may be assumed to be approaching in a directly horizontal manner, thereby paralleling the imaginary horizon vector 240. Decreasing the blade pitch from φ 225 to φ' 275 will result in a corresponding decrease in the angle of attack from θ 220 to θ' 270.

As currently illustrated in FIG. 2A, the airfoil may have an angle of attack 220 of θ. In some embodiments, the angle of attack 220 may be between 1 and 20 degrees. To maximize generated lift at takeoff conditions, the airfoil cross-section at the blade tip may hold the angle of attack 220 at 20 degrees. However, at higher propeller speeds, a small angle of attack (e.g. angle of attack 220 of 1-2 degrees) may be preferred to minimize the drag forces.

Figure 2B:
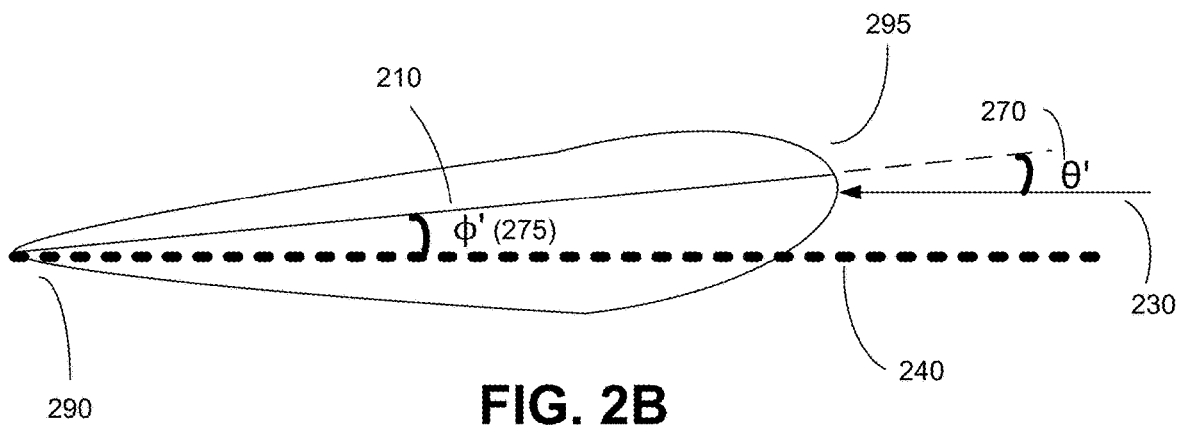
FIG. 2B illustrates an airfoil at high propeller speeds, in accordance with an example embodiment.

FIG. 2B illustrates an airfoil cross-section at the tip 120 of a blade 105 at high propeller speeds, in accordance with an example embodiment. In various embodiments, the reduced blade pitch φ' 275 may be achieved by displacing only the trailing edge 290 upwards while holding the leading edge 295 in place. In other embodiments, the reduced blade pitch φ' 275 may be achieved by shifting the leading edge 295 downward while holding the trailing edge 290 in place.

Although FIGS. 2A and 2B depict a particular example design of the airfoil, one skilled in the art may envision a variety of different airfoil shapes that can achieve the same changes in blade pitch by displacing the trailing edge 290 or the leading edge 295. This includes varying intrinsic parameters of the airfoil including the camber, maximum camber length, thickness, maximum thickness, and chord length.

Furthermore, one skilled in the art will understand that although FIGS. 2A and 2B depict the airfoil cross-section at the blade tip 125, the subsequent embodiments may depict airfoil cross-sections at different points along the radius of the blade. Airfoils at different locations along the radius of the blade may differ substantially in the intrinsic airfoil parameters (e.g. camber, thickness, chord length). However, structural embodiments for achieving a particular elastic modulus may be applied to airfoil cross-sections at different locations of the propeller blade.

Elastic Moduli of a Variable Pitch Propeller

In one embodiment, a model propeller may have a blade radius of 3 inches. During take-off, the blade tip 125 has a pitch φ 225 of 20 degrees and changes to a blade pitch φ' 275 of 1 degree at hovering conditions. By way of example of a quadcopter, there are 4 propellers, and each propeller has 2 blades, each propeller blade must support ⅛ of the total quadcopter weight of 15 pounds (6.8 kg). At the blade tip 125, the chord length, C, is approximately 0.2 inches (5 mm).

Modeling the airfoil as a cantilever beam that is fixed on the leading edge, the elastic modulus, E, of the airfoil may be calculated using the beam equation:

$$E = \frac{F * C^4}{8 * \Delta d * I}$$

where F is the uniformly applied lift force on the propeller blade, C is the chord length, Δd is the desired displacement of the trailing edge 290, and I is the moment of inertia of the propeller blade, e.g., blade 105. The desired displacement of the trailing edge 290 may be calculated by the equation $$\Delta d = C * \sin(\phi) - C * \sin(\phi')$$

where C is the chord length φ and φ' and IV are the blade pitch at takeoff and hovering speeds, respectively. Therefore, the estimated elastic modulus, E, of the trailing edge 290 of the blade tip is approximately 8 GPa in order to achieve a blade pitch change from 20 degrees at takeoff to 1 degree at hovering conditions. To ensure that limited deflection occurs for the leading edge 295, the elastic modulus of the leading edge 295 may be several-fold higher (e.g., 100 Gigapascal (GPa)).

One skilled in the art will be able to readily appreciate that the calculations provided here are for an airfoil located at the blade tip 125 with a particular set of characteristics. Altering the airfoil parameters such as the chord length will have an effect on the desired elastic modulus of the airfoil.

Laminar Structure of an Airfoil

Figure 3:
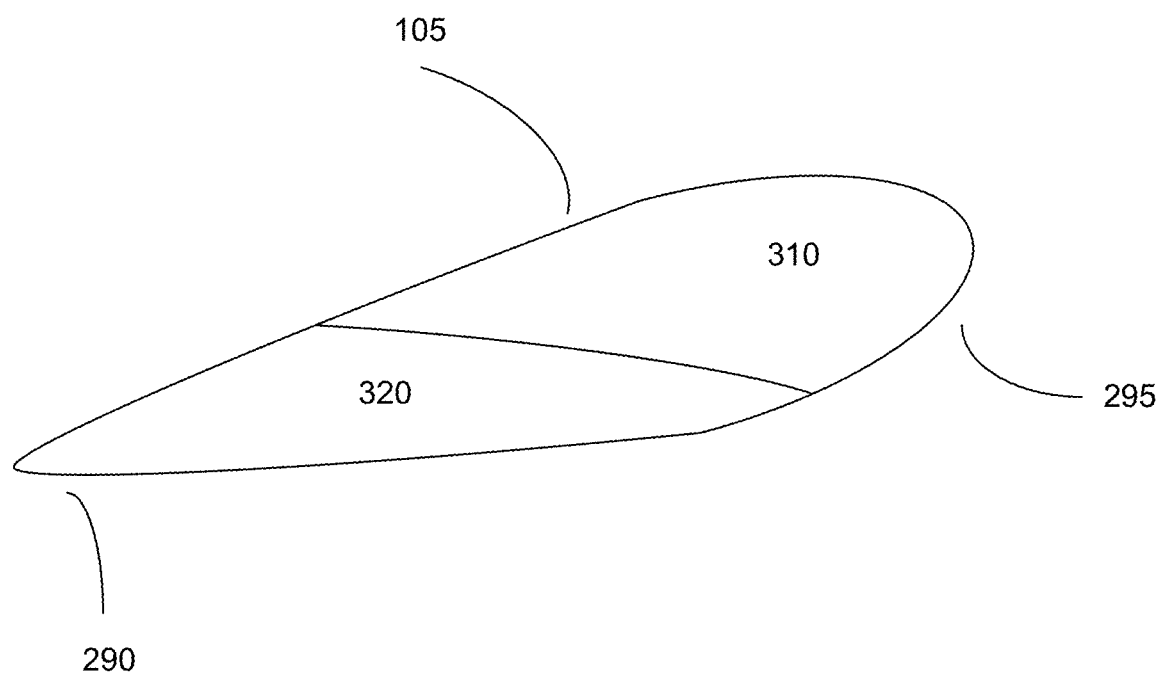
FIG. 3 illustrates an airfoil with a laminar structure, in accordance with an example embodiment.

FIG. 3 illustrates an airfoil design of a blade 105 with a modular structure, in accordance with an example embodiment. In one example embodiment, the modular structure comprises two separate sections. Each section may be composed of a different material with different structural properties. Additionally, the first section 310 includes the leading edge 295 whereas a second section 320 includes the trailing edge 290.

In various example embodiments, the first section 310 comprises a material that has a large elastic modulus whereas the second section 320 comprises a material with a low elastic modulus. For example, given that the desired elastic modulus of the trailing edge 290 was previously calculated to be 8 GPa, the second section 320 may be composed of a material that has the desired elastic modulus of 8 GPa. Therefore, at hovering speeds, the second section 320 substantially bends, as illustrated in FIG. 2B and the trailing edge 290 is displaced upward to achieve the desired reduction in the blade pitch to φ' 275. Alternatively, the first section 310 may be composed of a material that is at least several-fold higher above a threshold value. For example, the first section 310 may have an elastic modulus that is >100 GPa, at least 10 times higher than the elastic modulus of the second section 320. This ensures that the first section withstands the lift forces and maintains its structural orientation at hovering speeds.

In some embodiments, the elastic modulus of the second section 320 falls within an appropriate range of elastic moduli. For example, at takeoff, the pitch of the propeller blade may be oriented at 10 degrees instead of 20 degrees to reduce the risk of stalling. At hovering conditions, the pitch of the blade may be reduced to 3 degrees to maintain a minimum amount of generated lift. With these new parameters, the desired elastic modulus of the second section is calculated to be 22 GPa. Therefore, the appropriate range of the elastic modulus of the second section 320 would be 8-22 GPa.

In FIG. 3, the airfoil is not limited by the depicted orientation of the first 310 and second 320 sections. Although FIG. 3 depicts an airfoil with only two sections of two different materials, other example embodiments may include three or more (e.g. tens, hundreds, or more) different sections. In some example embodiments, the different sections may be organized as an individual layer to form an airfoil with a laminar structure. In some example embodiments, the individual layers comprising the laminar structure may be anisotropic. This example embodiment is further discussed below with FIG. 4.

In some example embodiments, the first section 310 comprises a first material such as carbon fiber whereas the second section 320 comprises a second material such as reinforced polycarbonate. Other types of materials that may be chosen include, but are not limited to, reinforced plastics (e.g., fiber reinforced plastics, glass reinforced plastics), fiber glass, aramid fibers, polypropylene, aluminum, polyacrylonitrile, pitch, and rayon. In some embodiments, a single section may comprise two or more materials as a composite material to achieve the desired elastic modulus of 20-40 GPa or >100 GPa.

Interspersion of Different Materials in an Airfoil

Figure 4A:
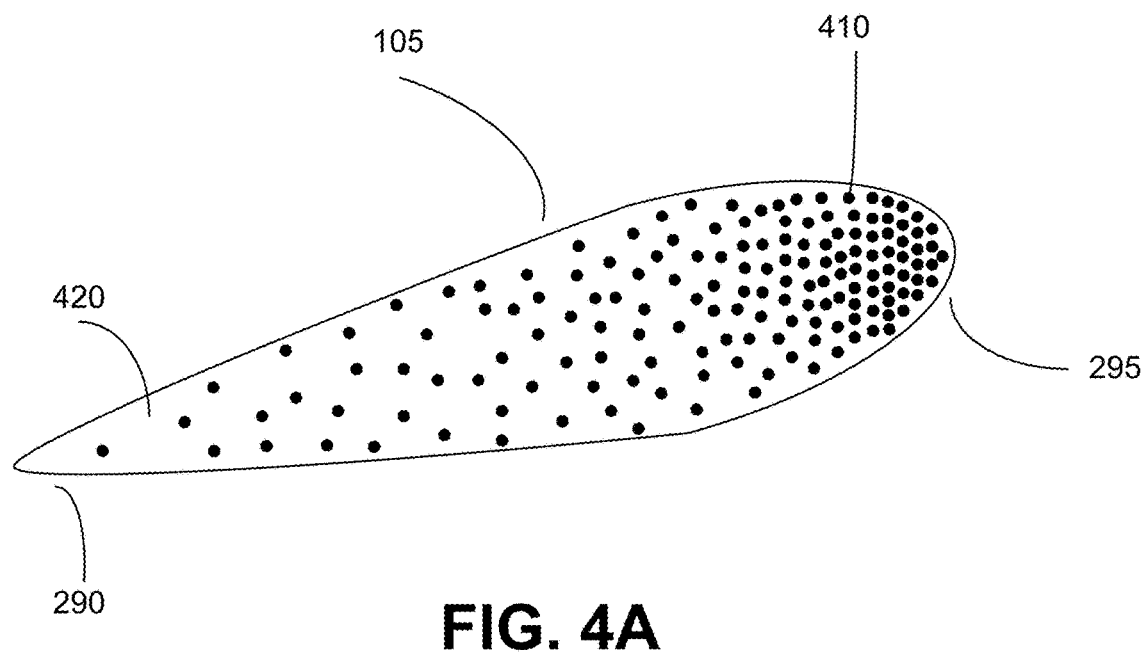
Figure 4B:
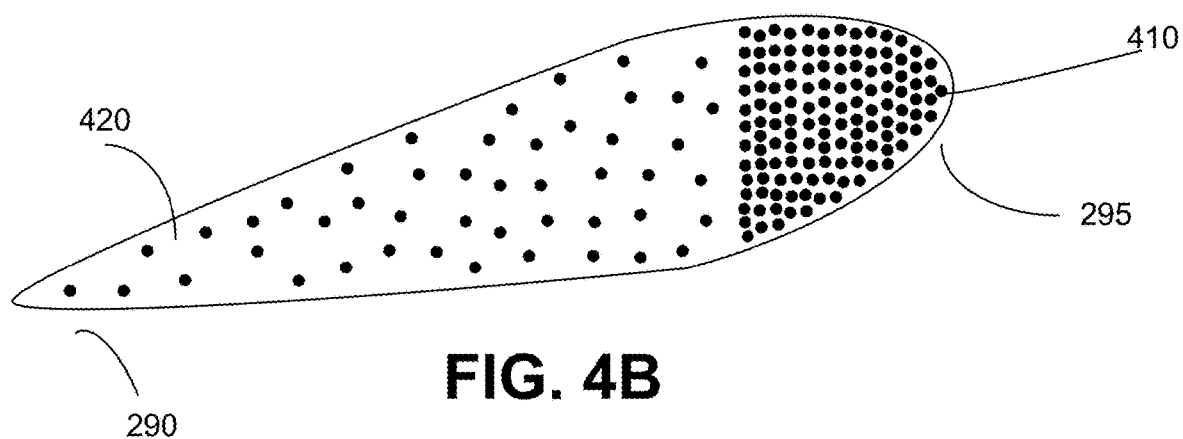

FIGS. 4A and 4B illustrate an airfoil of a blade 105 with one material interspersed throughout a second material, in accordance with an example embodiment. In one example embodiment, the structure of the airfoil is anisotropic and includes individual fiber sections composed of a first material 410 with a high elastic modulus. These individual fiber sections may be oriented perpendicular to the plane of the airfoil cross-section and travel longitudinally between the blade root 120 and blade tip 125. The fiber sections of the first material 410 are interspersed in a matrix section of the second material 420 that possesses a smaller elastic modulus. The configuration illustrated in FIGS. 4A and 4B may be referred to as a "longitudinal fiber structure." To achieve the desired elastic moduli at the leading 295 and trailing 290 edges, the volume fraction of the first 410 and second 420 materials may be tailored.

For example, the leading edge 295 of the propeller blade may contain a high volume fraction of the first material 410 and a low volume fraction of the second material 420 to achieve a higher elastic modulus. Conversely, in the trailing edge 290, sections of the first material 410 are sparsely scattered throughout a higher volume fraction of sections of a second material 420 to obtain a lower elastic modulus.

Given that the lift forces generated by the rotating propeller blade act upwards, the force vector is perpendicular to the individual fibers of the first material 410. Therefore, in this embodiment, the transverse elastic modulus, $E_c$, of the composite material is considered. Using the rule of mixtures for the transverse elastic modulus, $E_c$ is calculated by $$E_c = \frac{E_1 E_2}{E_1(1-V_1) + E_2 V_1}$$

where $E_1$ and $E_2$ are the elastic moduli for the first and second material, respectively and $V_1$ is the volume fraction of the first material.

As previously determined, the desired transverse modulus for the trailing edge would be approximately $E_c$=8 GPa. In one embodiment, the first material 410 may be composed of individual carbon fiber with an approximate elastic modulus of 150 GPa. The second material 420 may be polycarbonate with an approximate elastic modulus of 3 GPa. Therefore, for a transverse modulus of $E_c$=8 GPa, carbon fibers amount to 65% of the volume fraction of the trailing edge whereas polycarbonate would account for 35% of the volume fraction. In the case of the leading edge, the desired modulus may be significantly higher at $E_c$=100 GPa. Therefore, 99% of the airfoil volume fraction is carbon fiber whereas 1% is polycarbonate. In other embodiments, the first material 410 may be glass fiber (E=180 GPa) and a second material 420 may be nylon (E=2 GPa).

In one example embodiment, proceeding from the leading edge 295 to the trailing edge 290 of the airfoil of the blade 105, the volume fraction of the first material 410 decreases in a continuous fashion. For example, as described in the previous embodiment, the volume fraction of carbon fiber may decrease linearly from 99% at the leading edge to 65% at the trailing edge 290. In some embodiments, the decrease occurs and may be modeled by an exponential decay, a logarithmic decay, or a polynomial decay model.

In some example embodiments the volume fraction of the first material 410 decreases in a non-continuous fashion when proceeding from the leading edge 295 to the trailing edge 290. For example, the blade 105 may have discrete sections with a constant volume fraction of the first material 410 interspersed through a second material 420. As depicted in FIG. 4B, the volume fraction of the first material 410 abruptly drops through a vertical delineation between the leading edge 295 and trailing edge 290.

Figure 4C:
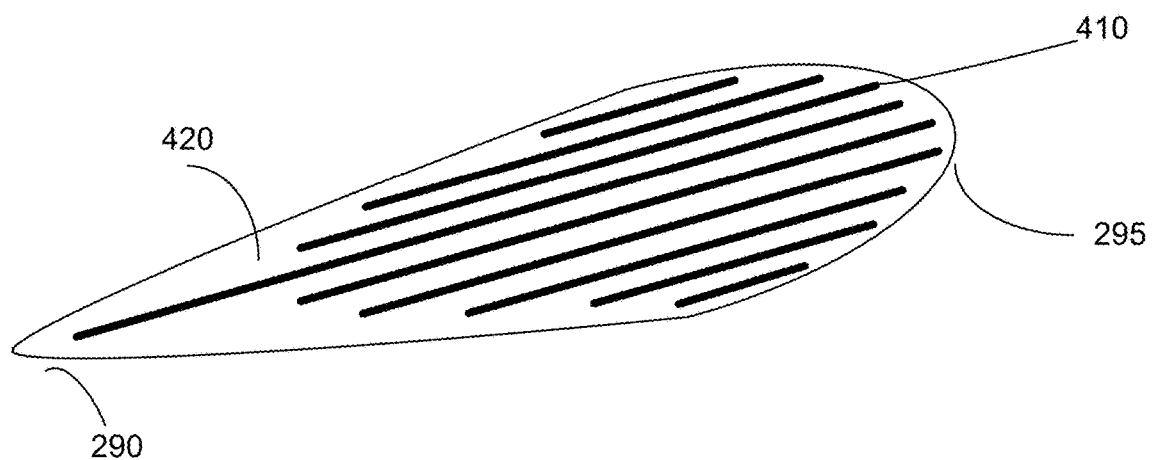

The example embodiments depicted in FIGS. 4A and 4B are not meant to be limiting. For example, the fibers of a first material 410 may be directionally oriented to travel along the chord line 210 of the airfoil cross-section as is illustrated in FIG. 4C. This configuration may be referred to as a "ribbed structure." Similar to FIGS. 4A and 4B, the volume fraction of the first material 410 at the training edge 290 is significantly lower than the volume fraction of the first material 410 at the leading edge 295.

Additionally, although, the first material 410 is shown to be a uniformly circular fiber that is traveling longitudinally through the airfoil cross-section of the blade 105, the interspersed fiber of the first material 410 may be of a different shape (e.g. square, rectangular) and the fiber diameter may be larger or smaller than depicted.

Figure 4D:
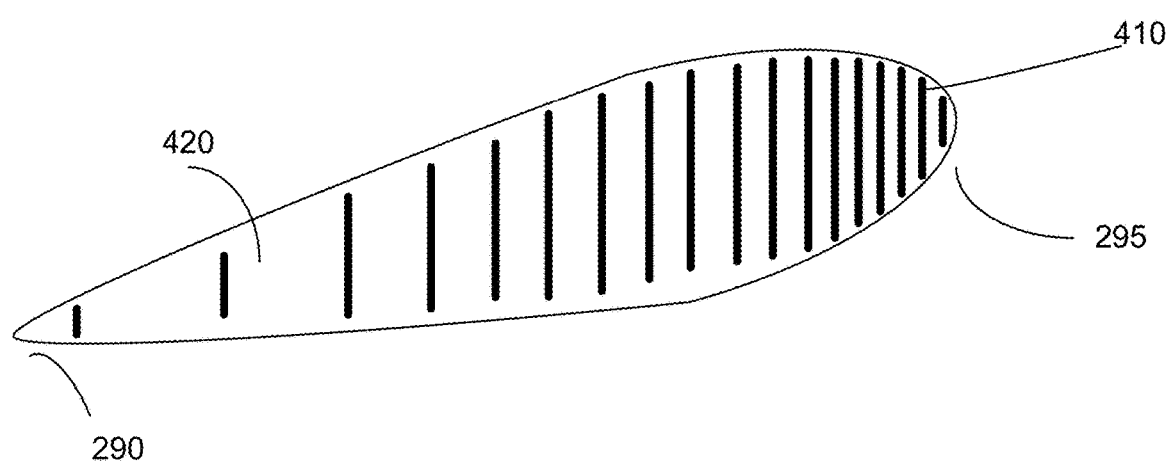

FIG. 4D depicts the fibers of a first material 410 oriented vertically (e.g. vertical fibers) in the airfoil. This configuration also may be referred to as a "ribbed structure." Vertical fibers may be referred to as fibers that travel in the plane of the airfoil and are perpendicular (or are ±10 degrees of being perpendicular) to the chord line 210 of the airfoil of the blade 105. Therefore, the vertical force vector of the generated lift on the airfoil cross-section may be applied longitudinally along the fibers. The rule of mixtures is similarly used to calculate the composite longitudinal elastic modulus, $E_c$ as $$E_c = E_1 V_1 + E_2(1-V_1)$$

Returning to the prior example involving carbon fiber (150 GPa) as a first material 410 and polycarbonate (3 GPa) as a second material 420, the trailing edge 290 is composed of 4% carbon fiber and 96% polycarbonate to achieve a composite elastic modulus $E_c$=8 GPa. At the leading edge 295, 66% carbon fiber and 34% polycarbonate yields a composite elastic modulus of $E_c$=100 GPa. The manner in which the volume fraction of the first material 410 decreases from the leading edge 295 to the trailing edge 290 may also occur following a linear, exponential, logarithmic, or polynomial fit.

One skilled in the art may recognize that the design of the airfoil is not limited to a first material 410 and a second material 420. Additional materials may be included as fibers interspersed in a matrix material. For fibers that are oriented perpendicular to the lift forces, the composite elastic modulus may be calculated from the equation $$\frac{1}{E_c} = \frac{V_1}{E_1} + \frac{V_2}{E_2} + \ldots + \frac{V_x}{E_x}$$

where $V_1+V_2+\ldots+V_x=1$ and $E_1, E_2, \ldots E_x$ are the respective elastic moduli for each material. Similarly, for fibers that are oriented longitudinally with the applied force, the composite elastic modulus may be calculated from the equation $$E_c = E_1V_1 + E_2V_2 + \ldots + E_xV_x.$$

In some embodiments, the vertically oriented fibers of the first material 410 may be organized into an anisotropic laminar structure as described in the prior embodiment in FIG. 3. For example, the first layer 310 may be a composite material that includes, by volume, 66% of vertically oriented carbon fibers and 34% polycarbonate matrix for an elastic modulus of 100 GPa. The second layer 320 may be a composite material that is, by volume, 4% vertically oriented carbon fibers and 96% polycarbonate matrix for an elastic modulus of 8 GPa. Because the rule of mixtures is only concerned with the volume percent of each material, in both the first and second sections, the individual fibers may be randomly interspersed in the second material 420 as long as they are vertically oriented.

In some example embodiments, the airfoil cross-section may include fibers of a first material that are oriented in multiple directions to improve the isotropic property of the composite material. For example, instead of uniaxial fibers, fibers may be oriented perpendicular to one another. Compared to uniaxial fibers, this orientation may reduce the mechanical strength. Perpendicularly oriented fibers may be mechanically interlocked to restore the lost mechanical strength. For example, perpendicularly oriented fibers may interweave with one another. In other embodiments, the first material 410 may be interspersed as discontinuous fibers, whiskers, or particles (e.g. nanoparticles, microparticles).

External Stimuli Responsive Material in an Airfoil

FIGS. 5A and 5B illustrate an airfoil with stimuli sensitive material, in accordance with two example embodiments. In FIG. 5A, stimuli responsive material 520 is included in a section encompassing the trailing edge 290. Additionally, components 515 that provide a stimulus are also situated in the trailing edge section. For example, the components 515 may be electrodes that generate a directional stimulus (e.g. electric field 550 and 560). The leading edge may be composed of a non-stimuli responsive material 530 (e.g., another material non-responsive to stimuli causing change). In one embodiment, the application of an external stimulus changes the structural properties of the trailing edge 290 whereas the properties of the leading edge 295 remain unchanged. Similarly, in FIG. 5B, stimuli responsive material 520 and stimulus components 515 are situated in a section encompassing the leading edge 295. In this embodiment, the trailing edge is composed of a non-stimuli responsive material 530. In one embodiment, the application of the external stimulus changes the structural properties of only the section encompassing the leading edge 295 or only the section encompassing the trailing edge 290. In some embodiments, both the leading edge 290 and trailing edge 295 have stimuli responsive material 520 and components 515 but the quantity in each may differ.

In some embodiments, the stimuli responsive material 520 makes up the entirety of the trailing edge 290 or leading edge 295. In these embodiments, the application of an external stimulus causes a displacement in the leading edge 295 (e.g. downward), or it may lead to a change in the elastic modulus of the leading edge 295 (e.g. increase) or trailing edge 290 (e.g. decrease).

In some example embodiments, the application of the external stimulus may be triggered by, for example, a human. In other example embodiments, the application of the external stimulus may be triggered automatically in response to, for example, operational factors such as certain flight parameters. For example, the external stimulus is applied in response to the rotational velocity of the propeller blade reaching a certain threshold speed. Another example includes applying the external stimulus in response to the rotational acceleration of the propeller blade reaching a certain threshold acceleration.

In one example embodiment, the external stimuli that triggers a change in the structural properties of the propeller blade is an electric field and the stimuli responsive material 520 may be a liquid crystal. Electrodes may be placed in the trailing edge 290 of the airfoil and selectively activated. The liquid crystal material possesses a long molecular axis that aligns with the direction of the applied electric field. In one embodiment, the electrodes 515 in the trailing edge 290 are activated to generate a horizontal electric field 550 (e.g. directionally from the trailing edge to the leading edge). The magnitude of the applied electric field influences the number of liquid crystals that align horizontally and subsequently, the magnitude of the reduction in the elastic modulus of the training edge 290.

In another example embodiment, the application of the external stimuli can increase the elastic modulus of the leading edge 295. For example, in FIG. 5B, the electrodes 515 may be activated to generate a vertical electric field 560. The aligned liquid crystals will increase the elastic modulus of the leading edge 295, thereby further reducing the deflection that may arise in response to the vertical lift forces.

In another embodiment, the stimuli responsive material 520 may be a piezoelectric material. Examples of stimuli responsive material 520 may include, but is not limited to, quartz and lead zirconate titanate (PZT). In response to an electric field, the piezoelectric material may bend to a desired configuration. For example, piezoelectric materials situated in the trailing edge 295 may cause the trailing edge 295 to upwardly displace upon exposure to an electric field. Similarly, the piezoelectric material, if situated in the leading edge 295, may cause the leading edge 295 to downwardly displace upon exposure to an electric field. In both cases, the structural change induced by the electric field reduces the blade pitch 225 and angel of attack 220 when desired (e.g. at high propeller speeds).

In some embodiments, the external stimuli may be a magnetic field. The stimuli responsive material 520 may include ferromagnetic materials and the components 515 generate a magnetic field in the airfoil of a blade 105. In some embodiments, the external stimuli may be a combination of both an electric field and a magnetic field for a material such as liquid crystal. In other embodiments, the external stimulus may be ultraviolet light or a temperature change.

Varying Propeller Material Along the Radius of the Blade

FIG. 6A illustrates a top-down view along the radius of the blade, in accordance with an embodiment of the invention. In one embodiment, the blade 105 is composed of a first segment of the blade 610 comprising the root of the blade 120, a second segment of the blade 620 comprising a midsection of the blade, and a third segment of the blade 630 comprising the tip of the blade 125. FIGS. 6B, 6C, and 6D represent the three segments 610, 620, and 630, respectively. Although FIG. 6 depicts three different airfoil cross-sections of the airfoil blade, one skilled in the art can understand that the blade may be a continuous segment extending from the root 120 to the blade tip 125.

In some embodiments, the propeller blade is twisted to generate different blade pitches along the length of the blade. For example, FIG. 6B depicts the first segment near the hub 610 with an airfoil with the highest blade pitch (e.g. 35-45 degrees). FIG. 6C depicts the midsection of the blade 620 with an intermediate blade pitch (e.g. 20-30 degrees). FIG. 6D depicts the third segment of the blade 630 with the lowest blade pitch (e.g. 1-20 degrees). In some embodiments, the blade pitch may decrease from the blade root 120 to the blade tip 125 following an exponential decay curve. In other embodiments, the decrease may follow a linear decay, a logarithmic decay, or a polynomial decay model.

At hovering speeds, the blade pitch of the first 610, second 620, and third 630 segments may change different amounts to reduce the drag on the blade. In some embodiments, the third segment 630 reduces its blade pitch the most significantly, given that the blade tip 125 travels near supersonic speeds when hovering or flying and is responsible for generating the most drag forces. For example, as previously discussed, the blade tip in the third segment 630 will undergo a significant reduction in the blade pitch from 20 degrees to 1 degree. Conversely, the blade root in the first segment 610 may undergo minimal reduction in the blade pitch, if any at all.

To achieve these changes in the blade pitch in the first 610, second 620, and third 630 segments of the propeller blade, the structural properties of the trailing edge 295 for airfoils in each segment may be tailored. For example, the third segment 630 of the propeller blade may have a trailing edge 295 with an elastic modulus of 8 GPa, in accordance with prior embodiments of the blade tip. FIG. 6D depicts one embodiment of an airfoil in the third segment 630 with 4% carbon fiber and 96% polycarbonate. Turning to the first segment 610 of the propeller blade, both the leading and trailing edge 290 have a high elastic modulus to ensure that the blade pitch of the root 120 of the blade 105 does not change substantially. FIG. 6A depicts an embodiment of the airfoil of the first segment 610 with a high volume fraction of vertically oriented continuous fibers. For example, the volume fraction of carbon fibers may be >66% whereas the volume fraction of polycarbonate is <34% to achieve an elastic modulus greater than 100 GPa throughout the entire airfoil. An airfoil from the second segment 620 may have a trailing edge 290 with an intermediate elastic modulus between 40 GPa and 80 GPa. Therefore, the volume fractions of carbon fiber and polycarbonate are 25-50% and 50-75% respectively. In all three segments 610, 620, and 630, the leading edge 295 remains at a high elastic modulus of 100 GPa or greater.

In various example embodiments, the desired elastic moduli of the three segments 610, 620, and 630 can be achieved using combinations of any of the previously described embodiments in, for example, FIGS. 3-5. For example, an airfoil of the first segment 610 may be a laminar structure with two layers of materials, each with an elastic modulus greater than 100 GPa. In the same example embodiment, the airfoil of the blade 105 in the third segment 630 may include stimuli sensitive material 520 such as liquid crystal and horizontally align in response to an electric field to reduce the elastic modulus of the trailing edge 290.

For ease of illustration, FIGS. 6B, 6C, and 6D depict airfoil cross-sections of a blade 105 that have the same intrinsic parameters. However, an airfoil of a blade 105 in the first segment 610 near the root 120 of the blade 105 may have very different characteristics than an airfoil near the tip 125 of the blade 105. For example, the airfoil in the first segment 610 may have a shorter chord length 210, larger thickness, and small camber to maximize the structural integrity at the connection with the rotor hub.

Additional Embodiment Considerations

The disclosed embodiments of the variable pitch propeller provides advantages over conventional propellers. The pitch of the propeller blade may be optimized for all in-flight conditions. For example, the blade pitch may be optimized so that lift forces may be maximized during takeoff while drag forces may be minimized during hovering conditions. In doing so, the efficiency of the propeller blade may be improved and overall power consumption may be reduced. Provided that, in various embodiments, an aerial vehicle, such as a quadcopter, may have more than one propeller blade, the improvement in efficiency may be substantial.

Additionally, conventional propeller blades are typically controlled through human intervention by means of a mechanical swashplate. To optimize the blade pitch during in-flight conditions, the individual must have training in aerodynamics to understand how to adjust the mechanical swashplate to achieve a particular blade pitch. Even so, human intervention often results in human and/or mechanical error. In contrast, the current embodiment can optimize the blade pitch for in-flight conditions without the need for human intervention.

Throughout this specification, as used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Upon reading this disclosure, those of skilled in the art will appreciate still additional alternative structural and functional designs for variable pitch propeller blades as disclosed from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement and details of the apparatus disclosed herein without departing from the spirit and scope defined in the appended claims.

What is claimed is:

1. A propeller blade comprising:
a first material traveling along or perpendicular to a chord line of the propeller blade; and
a second material different from the first material, the first material being interspersed as fibers through the first material, a volume fraction of the first material decreasing in a continuous fashion or in a non-continuous fashion from a leading edge of the propeller blade to a trailing edge of the propeller blade, the continuous fashion comprising a decrease modeled by exponential decay, logarithmic decay, or polynomial decay, the non-continuous fashion comprising discrete sections with a constant volume fraction of the first material interspersed through the second material.

2. The propeller blade of claim 1, wherein the first material comprises carbon fiber or glass fiber and the second material comprises polycarbonate or nylon.

3. The propeller blade of claim 2, wherein the volume fraction of the carbon fiber decreases linearly from 99% at a leading edge to 65% at a trailing edge.

4. The propeller blade of claim 3, wherein the leading edge comprises 66% carbon fiber and 34% polycarbonate and the trailing edge comprises 4% carbon fiber and 96% polycarbonate.

5. The propeller blade of claim 1, wherein the first material has a volume fraction greater than or equal to 66% interspersed as fibers through the second material.

6. The propeller blade of claim 1, wherein the first material is interspersed as fibers through the second material at a higher volume fraction near a leading edge than a trailing edge.

* * * * *